(12) United States Patent
Versini et al.

(10) Patent No.: US 12,038,053 B2
(45) Date of Patent: Jul. 16, 2024

(54) ELECTRIC DRIVELINE SYSTEM WITH POWER TAKE-OFF AND ELECTRIC DRIVELINE SYSTEM OPERATING METHOD

(71) Applicant: Dana Belgium N.V., Flanders (BE)

(72) Inventors: Jessica Versini, Bruges (BE); Joachim Van Dingenen, Drongen (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/297,518

(22) Filed: Apr. 7, 2023

(65) Prior Publication Data

US 2023/0243391 A1 Aug. 3, 2023

Related U.S. Application Data

(62) Division of application No. 17/455,401, filed on Nov. 17, 2021, now Pat. No. 11,655,863.

(51) Int. Cl.
| | |
|---|---|
| *F16D 48/06* | (2006.01) |
| *B60K 1/02* | (2006.01) |
| *B60K 17/28* | (2006.01) |
| *B60K 25/00* | (2006.01) |
| *B60K 17/356* | (2006.01) |
| *F16H 3/72* | (2006.01) |

(52) U.S. Cl.
CPC ............ *F16D 48/06* (2013.01); *B60K 1/02* (2013.01); *B60K 17/28* (2013.01); *B60K 25/00* (2013.01); *B60K 17/356* (2013.01); *B60K 2025/005* (2013.01); *B60Y 2300/192* (2013.01); *F16D 2500/10437* (2013.01); *F16D 2500/1045* (2013.01); *F16D 2500/10456* (2013.01); *F16H 3/728* (2013.01); *F16H 2200/0021* (2013.01); *F16H 2200/0034* (2013.01); *F16H 2200/2005* (2013.01)

(58) Field of Classification Search
CPC ........ B60K 1/02; B60K 17/28; B60K 17/356; B60K 2025/005; B60K 25/00; F16H 2200/0021; F16H 2200/0034; F16H 2200/2005; F16D 21/00; F16D 48/06; F16D 48/062; F16D 23/02; F16D 2500/10437; F16D 2500/1045; F16D 2500/10456

See application file for complete search history.

(56) References Cited

U.S. PATENT DOCUMENTS

| | | |
|---|---|---|
| 7,610,976 B2 | 11/2009 | Holmes et al. |
| 9,446,664 B2 | 9/2016 | Huber et al. |

(Continued)

FOREIGN PATENT DOCUMENTS

| | | |
|---|---|---|
| DE | 102015205218 A1 | 9/2016 |
| DE | 102018222251 A1 | 6/2020 |

(Continued)

*Primary Examiner* — Timothy Hannon
(74) *Attorney, Agent, or Firm* — McCoy Russell LLP

(57) ABSTRACT

An electric driveline system is provided. The electric driveline system includes a first electric machine and a second electric machine mechanically coupled to a transmission and a power take-off (PTO) assembly coupled to the first electric machine. The PTO assembly includes a first clutch coupled to a PTO gearset and designed to selectively disconnect a PTO from the first electric machine and the PTO gearset is mechanically coupled to the first electric machine.

15 Claims, 7 Drawing Sheets

(56) References Cited

U.S. PATENT DOCUMENTS

| | | |
|---|---|---|
| 11,890,928 B2 * | 2/2024 | Brolles .................... B60K 1/00 |
| 2006/0241840 A1 | 10/2006 | Steen et al. |
| 2007/0267233 A1 | 11/2007 | Wenthen |
| 2008/0264026 A1 | 10/2008 | Ishii et al. |
| 2011/0042155 A1 | 2/2011 | Tarasinski et al. |
| 2012/0221197 A1 | 8/2012 | Hisada et al. |
| 2015/0135863 A1 | 5/2015 | Dalum |
| 2020/0122563 A1 | 4/2020 | Scholle |
| 2020/0391582 A1 | 12/2020 | Serrao et al. |
| 2021/0018072 A1 | 1/2021 | Steinberger et al. |
| 2021/0354684 A1 * | 11/2021 | Healy ................... B60W 10/02 |
| 2023/0011463 A1 * | 1/2023 | Brolles ................. B60K 17/28 |
| 2023/0084680 A1 | 3/2023 | Vin Dingenen et al. |

FOREIGN PATENT DOCUMENTS

| | | | |
|---|---|---|---|
| DE | 102019214405 A1 | 3/2021 | |
| WO | WO-2020058111 A1 * | 3/2020 | ............... B60K 1/02 |
| WO | 2021121594 A1 | 6/2021 | |

\* cited by examiner

| Forward Drive Mode With PTO Disengagement | | |
|---|---|---|
| | First Gear | Second Gear |
| Clutch (148) | | X |
| Clutch (162) | X | |
| Synchronizer (160) | X | |
| Synchronizer (141) | | |
| Clutch (135) | X | X |
| Synchronizer (133) | X | X |

FIG. 2E

| Forward Drive Mode With PTO Engagement | | |
|---|---|---|
| | First Gear | Second Gear |
| Clutch (148) | | X |
| Clutch (162) | X | |
| Synchronizer (160) | X | |
| Synchronizer (141) | X | X |
| Clutch (135) | X | X |
| Synchronizer (133) | X | X |

FIG. 2F

| Reverse Drive Mode With PTO Engagement | | |
|---|---|---|
| | First Gear | Second Gear |
| Clutch (148) | | X |
| Clutch (162) | X | |
| Synchronizer (160) | X | |
| Synchronizer (141) | X | X |
| Clutch (135) | | |
| Synchronizer (133) | | |

FIG. 2G

ELECTRIC DRIVELINE SYSTEM WITH POWER TAKE-OFF AND ELECTRIC DRIVELINE SYSTEM OPERATING METHOD

CROSS REFERENCE TO RELATED APPLICATION

The present application is a divisional of U.S. Non-Provisional patent application Ser. No. 17/455,401, entitled "ELECTRIC DRIVELINE SYSTEM WITH POWER TAKE-OFF AND ELECTRIC DRIVELINE SYSTEM OPERATING METHOD", and filed on Nov. 17, 2021. The entire contents of the above-listed application are hereby incorporated by reference for all purposes.

TECHNICAL FIELD

The present disclosure relates to a multi-speed electric driveline system and a method for operation of said driveline system.

BACKGROUND AND SUMMARY

Multi-speed transmissions have been deployed in certain electric vehicles (EVs) due to their increased responsiveness and gains in motor operating efficiency that the transmission affords when compared to EVs using single speed geartrains. Some of these prior multi-speed electric drive units do not have components that rotate independently from the wheels when the vehicle is at standstill. Moreover, certain electric drivelines demand that the driveline components rotate in an opposite direction (in comparison to forward drive) when operating in reverse. This presents barriers to implementing power take-off (PTO) capabilities for driving auxiliaries when operating the driveline in reverse, at standstill, or in forward drive at low speeds.

Some attempts have been made to provide PTO functionality into certain EVs. For instance, US 2015/0135863 A1 to Dalum discloses a hybrid vehicle drive system that uses an electric motor to power a PTO which, in turn, drives accessories. The PTO in Dalum's system is not capable of concurrently driving both the accessories and providing motive power to the transmission.

The inventors have recognized several drawbacks with Dalum's drive system as well as other electric drive systems. For instance, the inability to simultaneously drive both the PTO accessories and provide motive power to the transmission using the electric motor constrains the system's capabilities, thereby decreasing customer appeal. Further, other systems have employed dedicated motors and inverters to independently power PTOs. These systems are complex and may present manufacturing difficulties.

The inventors have recognized the aforementioned issues and developed an electric driveline system. In one example, the electric driveline system includes a first electric machine and a second electric machine mechanically coupled to a transmission. The electric driveline system further includes a PTO assembly coupled to the first electric machine. This PTO assembly includes a first clutch coupled to a PTO gearset and is designed to selectively disconnect a PTO from the first electric machine. Further, in the system, the PTO gearset is mechanically coupled to the first electric machine. In this way, the first electric machine is able to provide power to both the transmission and the PTO at overlapping times, if wanted. As a result, the system's capabilities are expanded via a PTO assembly that uses power from an electric machine which is also designed to provide motive power to the transmission. Further, the complexity and cost of the system may be reduced, if wanted, when compared to electric drive systems which use dedicated motors for powering PTOs, for instance.

In another example, the electric driveline system may further include a second clutch designed to selectively disconnect the first electric machine from the transmission. In such an example, the system may additionally include a controller configured to operate the second clutch to disconnect the transmission from the first electric machine, while the second electric machine is transferring mechanical power to the transmission. This disconnection may occur when the second electric machine is operated to rotate the transmission in a reverse drive direction. In this way, the window of PTO operation with regard to driveline operating conditions is expanded, thereby broadening the system's capabilities and increasing customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2E-2G show charts correlating the various electric driveline system operating modes to clutch and synchronizer positons.

DETAILED DESCRIPTION

An electric driveline with a multi-speed transmission and power take-off (PTO) disconnect capabilities is described herein. The PTO disconnect capabilities are achieved using a PTO assembly with clutches that function to selectively connect and disconnect a PTO from an electric machine as well as selectively disconnect the electric machine from the transmission, during certain operating conditions. In this way, the PTO is able to operate over a wider range of operating conditions.

Figure 1:
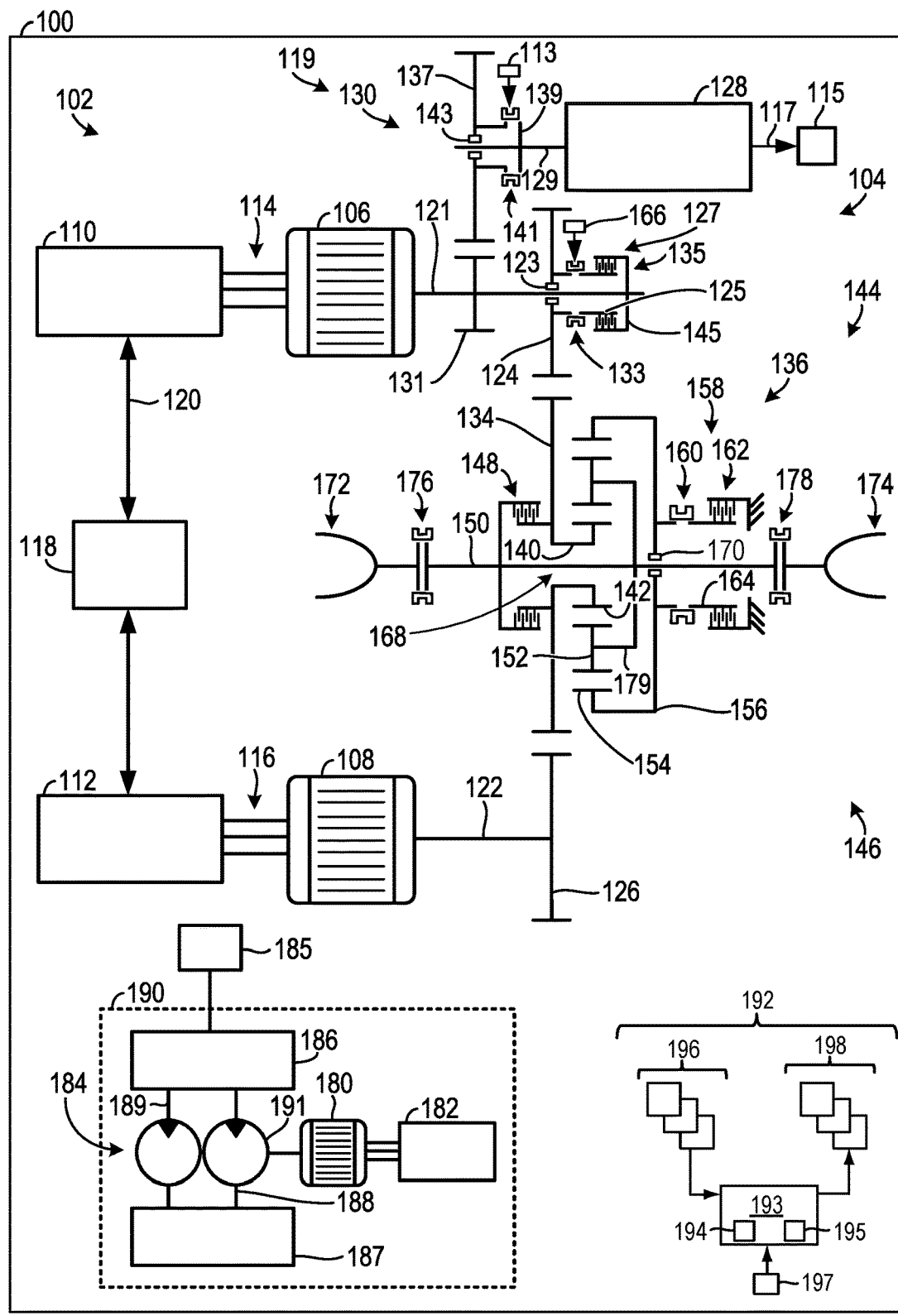
FIG. 1 shows a portion of a vehicle with an electric driveline system.

FIG. 1 depicts a vehicle 100 with an electric driveline system 102. As such, the vehicle 100 may be an electric vehicle (EV), such as a battery electric vehicle (BEV). All-electric vehicles may specifically be used due to their reduced complexity and therefore reduced points of potential component degradation. However, hybrid electric vehicle (HEV) embodiments may be employed where the vehicle includes an internal combustion engine (ICE).

The electric driveline system 102 includes a transmission 104 that is rotationally coupled to a first electric machine 106 and a second electric machine 108. Each of the electric machines 106, 108 may include conventional components such as a rotor and a stator that electromagnetically interact during operation to generate motive power. Furthermore, the electric machines may be motor-generators which also generate electrical energy during regeneration operation. Further, the electric machines may have similar designs and sizes, in one example. In this way, manufacturing efficiency may be increased. However, the electric machines may have differing sizes and/or component designs, in alternate examples.

Further, the electric machines 106, 108 may be multi-phase electric machines that are supplied with electrical energy through the use of a first inverter 110 and a second inverter 112. These inverters and the other inverters described herein are designed to convert direct current (DC) to alternating current (AC) and vice versa. As such, the electric machines 106, 108 as well as the other electric machines may be AC machines. For instance, the electric machines 106, 108 and the inverters 110, 112 may be three-phase devices, in one use-case example. However, motors and inverters designed to operate using more than three phases have been envisioned. The electrical connections between the inverters 110, 112 and the electric machines 106, 108 is indicated via lines 114, 116 (e.g., multi-phase wires), respectively.

The inverters 110, 112 may receive DC power from at least one electrical energy source 118 (e.g., an energy storage device such a traction battery, a capacitor, combinations thereof, and the like, and/or an alternator). Arrows 120 indicate the flow of electrical energy from the energy source 118 to the electric machine 106, 108. Alternatively, each inverter may draw power from at least one distinct energy source. When both the inverters are coupled to one energy source, the inverters may operate at a similar voltage. Alternatively, if both inverters are coupled to distinct electrical energy sources, they may operate at different voltages, in some examples.

The system 102 further includes a PTO assembly 119. The PTO assembly 119 includes a PTO 128 (e.g., a mechanical or hydraulic PTO unit) and may also include a PTO gearset 130. The PTO gearset 130 may include a gear 137 and a gear 131 coupled to the output shaft 121 such that the gear 131 and the output shaft 121 jointly rotate. A bearing 143 may serve as an interface between the gear 137 and an input shaft 129 of the PTO 128. Thus, the gear 137 and the input shaft 129 may independently rotate, under some conditions, elaborated upon herein. One or more auxiliary devices 115 may be driven by the PTO 128 as denoted via line 117. These auxiliary devices may include a steering pump, a pump for working hydraulic devices, an air conditioning pump, and the like.

The PTO assembly 119 may utilize clutches (e.g., friction clutches, synchronizers, dog clutches, combinations thereof, and the like) to selectively provide mechanical power to the PTO 128, as will be expanded upon herein. As such, the PTO assembly 119 may be designed to mechanically couple and decouple the PTO 128 from the electric machine 106. Although the PTO 128 is designed to selectively rotationally couple to the first electric machine 106, the second electric machine 108 may, additionally or alternatively, have a PTO and an associated gear and clutch assembly coupled thereto. However, when the system includes two PTOs coupled to the different electric machines, one of the PTOs may be disconnected during reverse drive operation.

In some examples, the output shaft 121 of the first electric machine 106 may have a gear 131 fixedly coupled thereon. The gear 131 may be coupled to a gear 137 of the PTO gearset 130. The gears described herein include teeth, and mechanical attachment between the gears involves meshing of the teeth. The gear 137 may be disposed about, and selectively coupled to, an input shaft 129 of the PTO 128. For instance, a bearing 143 may be used to attach the gear 137 to the PTO input shaft 129 such that the gear 137 independently rotates in relation to the PTO input shaft 129 during certain operating conditions. Further the gears 131, 137 included in the PTO gearset 130 may have a gear ratio that is selected to provide rotational input to the PTO within a desired torque range.

The PTO assembly 119 includes a first clutch 141. The first clutch 141 is specifically illustrated as a synchronizer, although other types of clutches, such as friction clutches, may be additionally or alternatively used for selectively coupling the PTO gearset 130 to the shaft 129, in other examples. Further, the clutch 141 may be designed to selectively couple the gear 137 for rotation with the PTO input shaft 129, by coupling the gear 137 with a shaft interface 139 of the input shaft 129. In this way, when the clutch 141 is engaged, mechanical power from the electric machine 106 may be transferred to the input shaft 129 of the PTO 128 via gears 131 and 137. Conversely, when the clutch 141 is not engaged, mechanical power from the electric machine 106 may not travel through the PTO gearset 130, whereby the gear 137 of the PTO gearset is not able to transfer mechanical power to the input shaft 129 of the PTO. In other words, the clutch 141 allows the PTO 128 to be selectively connected and disconnected from the first electric machine 106 in different operating modes. Further, a shift fork or other suitable actuator, as schematically illustrated at 113, may be used to engage and disengage the clutch 141.

The output shafts 121, 122 of the electric machines 106, 108 may have gears 124, 126 which reside thereon, respectively. In some examples, the gear 124 may be rotatably coupled to the output shaft 121. To rotatably attach the gear 124 to the shaft 121, a bearing 123 (e.g., a roller bearing such as needle roller bearing, a ball bearing, and the like) may be used. A bearing as described herein may include inner races, outer races, and roller elements (e.g., balls, cylindrical rollers, tapered cylindrical rollers, and the like). This rotatable attachment between the gear 124 and the output shaft 121 allows the first electric machine 106 to be selectively rotationally decoupled from the transmission 104.

To accomplish the selective decoupling of the first electric machine 106 from the transmission 104, a second clutch 135 may be included in the PTO assembly 119, in some examples. Further, the second clutch 135 may be included in a clutch assembly 127. The clutch assembly 127 may be positioned coaxial to the output shaft 121 and is designed to selectively couple the gear 124 for rotation with the output shaft 121. The clutch assembly 127 may further include a synchronizer 133 positioned in series with a friction clutch 135. More specifically, the synchronizer 133 and the friction clutch 135 may be coaxially arranged. A friction clutch, as described herein, may include two sets of plates designed to frictionally engage and disengage one another while the clutch is opened and closed. As such, the amount of torque transferred through the clutch may be modulated depending on the degree of friction plate engagement. Thus, the friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The friction clutch 135 and other friction clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

The friction clutch 135 may include a drum 145 coupled to the output shaft 121 and carrying a set of the friction plates, and a clutch component 125 (e.g., clutch hub) that carries a set of separator plates. Further, the synchronizer 133 may be designed to selectively couple the gear 124 for rotation with the clutch component 125 of the friction clutch 135. Thus, when the friction clutch 135 is engaged (e.g., in a closed position), the synchronizer 133 may engage an interface of the gear 124 so that the gear 124 is coupled for rotation with the output shaft 121 of the electric machine 106.

The synchronizer 133 is designed to synchronize the speed of the clutch component 125 of the friction clutch 135 (e.g., as effected by the output shaft 121 and the degree of engagement of the friction plates in the clutch 135) and the gear 124. For instance, the synchronizer 160 may include a sleeve with splines, ramped teeth, and the like designed to engage an interface of the gear 124 in order to achieve the aforementioned functionality. Further, a shift fork or other suitable actuator, as schematically illustrated at 166, may be used to engage and disengage the synchronizer 133. In this way, when the friction clutch 135 and the synchronizer 133 of the clutch assembly 127 engage the gear 124, mechanical power output from the electric machine 106 (via the output shaft 121) may be transferred into the transmission 104, as will be described herein. Conversely, the electric machine 106 may be decoupled from the transmission 104 when the clutch assembly 127 is disengaged from the gear 124.

It will be understood that, in different examples, the PTO gearset 130 and the output shaft 121 of the electric machine 106 may utilize different configurations of clutches and/or synchronizer mechanisms for achieving the aforementioned functionalities. For instance, in some cases, the clutch assembly 127 may include a single wet friction clutch without the synchronizer 133 and/or the clutch 141 may be a wet friction clutch arranged for coupling the gear 137 of the PTO gearset 130 to the input shaft 129 of the PTO 128. However, other clutch arrangements (e.g., dry friction clutches, dog clutches, etc.) have been contemplated, in different examples. Further, in different embodiments, the clutch 141 or the clutch assembly 127 may be omitted from the transmission 104. In these embodiments, the transmission's packaging efficiency may be increased at the expense of reduced functionality.

The gears 124, 126 are each coupled to (e.g., in meshing engagement with) a gear 134 of a planetary gearset 136 in the transmission 104. The planetary gearset 136 may include a shaft 140 which connects the gear 134 to a sun gear 142. The gears 124, 126 may specifically be positioned on different sides 144, 146 of the transmission 104 to enhance packaging and provide a more balanced weight distribution in the electric driveline system 102, if wanted. More generally, the rotational axes of the gears 124 and 126 as well as the electric machines 106 and 108 may be parallel to one another.

A friction clutch 148 is coupled to the shaft 140 and designed to selectively rotationally couple the shaft to an output shaft 150. In some examples, the friction clutch 148 may be substantially similar to the friction clutch 135 as described above, and may therefore be a wet friction clutch. The sun gear 142 in the planetary gearset 136 may be coupled to the shaft 140. Further, planet gears 152, in the planetary gearset 136, may be coupled to the sun gear 142. Further, the planet gears 152 may be mechanically coupled to a ring gear 154 in the planetary gearset 136.

A shaft 156 may extend from the ring gear 154 and have a second friction clutch assembly 158 residing thereon. The second friction clutch assembly 158 may include a synchronizer 160 arranged in series with a friction clutch 162. Placing the synchronizer 160 in series with the friction clutch 162 enables the transmission's efficiency to be increased when operating in the second gear. Again, the synchronizer 160, as well as the other synchronizers described herein, may be similar to the synchronizer 133 and actuated accordingly. To elaborate, the synchronizer 160 permits a portion of the shaft 164 to be disconnected from the clutch 162 and freely rotate while the system operates in the second gear. As such, the plates in the clutch 162 may not rotate when the synchronizer is disengaged. Conversely, when the synchronizer 160 is engaged, the shaft 164 and the shaft 156 of the ring gear 154 rotate in unison. The synchronizer 160 is designed to synchronize the speed of the shaft 156 and a shaft 164 coupled to the friction clutch 162, and mechanically lock rotation of the shafts 156, 164, when engaged. To increase system compactness, the friction clutches 148, 162 as well as the output shaft 150 may be coaxially arranged. To permit this coaxial arrangement, the sun gear 142 may include an opening 168 through which the output shaft extends.

The friction clutch 162 is designed to ground the ring gear 154. To accomplish the ring gear grounding, the friction clutch 162 may include a housing with a portion of the friction plates coupled thereto and fixedly attached to a stationary component, such as the transmission's housing. A bearing 170 may be positioned between the shaft 156 and the output shaft 150 to enable these shafts to independently rotate, during certain conditions.

The output shaft 150 includes output interfaces 172, 174 (e.g., yokes, splines, combinations thereof, or other suitable mechanical interfaces) designed to attach to axles (e.g., front or rear axles) via shafts, joints (e.g., U-joints), chains, combinations thereof, and the like.

Disconnect clutches 176, 178 may be provided for each of the output interfaces 172, 174. As such, the disconnect clutches 176, 178 may be designed to mechanically couple and decouple the output shaft 150 from the output interfaces 172, 174. In this way, the transmission's capabilities may be further expanded to enable single and multi-axle operation. For instance, four-wheel drive may be engaged when additional traction is desired and two-wheel drive may be engaged when the additional traction is not desired to reduce driveline losses and tire wear. In this way, the handling performance of the vehicle is enhanced. The disconnect clutches 176, 178 may be dog clutches, synchronizers, friction clutches, combinations thereof, or other suitable clutches. Dog clutches and/or synchronizers may be specifically used as axle disconnect devices, in some examples, to reduce losses when the clutches are disengaged, when compared to friction clutches.

The planet gears 152 rotate on a carrier 179 of the planetary gearset 136. The carrier 179 is rotationally coupled to the output shaft 150. The planetary gearset 136 may be a simple planetary gearset that solely includes the sun gear 142, ring gear 154, planet gears 152, and carrier 179. By using a simple planetary assembly, transmission compactness may be increased when compared to more complex planetary assemblies such as multi-stage planetary assemblies, Ravigneaux planetary assemblies, and the like. Consequently, the driveline system may pose less space constraints on other vehicle components, thereby permitting the system's applicability to be expanded. Further, losses in the transmission may be decreased when a simple planetary gearset is used as opposed to more complex gear arrangements.

Depending on the gear ratio of the transmission, mechanical power may travel through the carrier 179 to the output shaft 150 or from the sun gear 142 to the output shaft. Mechanical power paths through the transmission in the different gears and shifting operation (e.g., powershifting operation) between the operating gears are discussed in greater detail herein with regard to FIGS. 2A-2D.

A third electric machine 180 and inverter 182 may be provided in the system 102. The third electric machine 180 is designed to drive a transmission pump 184 which generates the flow of a fluid (e.g., a lubricant such as oil) through the transmission 104. It will be understood that lubricant as described herein is a fluid such as oil that may be used for lubricating components as well as for component actuation and/or cooling. Furthermore, a valve 186 is coupled to an output of the pump 184 and regulates the flowrate of lubricant through the transmission 104. The valve 186 may be in fluidic communication with components 185 (schematically depicted in FIG. 1) in the transmission 104 that receive lubricant. The lubricant may be routed to the desired components via lubricant conduits, jets, additional valves, manifolds, combinations thereof, and the like. Further, the components 185 may include gears, clutches, hydraulic pistons for clutch actuation, and the like.

Once the lubricant is routed from the valve 186 to the lubricated components, the lubricant returns to a sump 187. Additionally, the sump 187 may be located in a transmission housing and profiled to gather lubricant from the lubricated components in the transmission. The pump 184 may receive lubricant from the sump 187 via pick-up conduits 188. Conversely, the pump outlets 189 deliver lubricant to the valve 186. It will be understood that the pump 184, the valve 186, and the sump 187 are included in a lubrication system 190. The lubrication system 190 may further include conduits for routing the lubricant to targeted components in the transmission such as the planetary gearset, clutches, and the like. The pump is illustrated in FIG. 1 as a double pump with two pump modules 191, but other pump designs have been contemplated.

Further, by using a separate electric machine to drive the transmission pump 184, the electric machine's speed and therefore pump speed may be adjusted to track with the lubricant demands in the transmission. For instance, the pump speed may be increased during shifting transients and then decreased while the transmission is sustained in one of the two discrete operating gears. This reduces hydraulic losses and allows the hydraulic system to be downsized, if desired.

The third electric machine 180 and the inverter 182 may be operated with a lower voltage current than the first and second electric machines 106, 108 and corresponding inverters. For instance, the lower voltage may be in the following range: 12 Volts (V)-144V and the higher voltage may be in the following range: 350V-800V, in one use-case example. However, other higher and lower voltage values may be used, in other examples. In this way, the transmission's efficiency may be increased. However, in other examples the first electric machine 106, the second electric machine 108, and the third electric machine 180 may be operated at a similar voltage (e.g., a higher voltage within the range of 350V-800V or a lower voltage within the range of 12V-144V, in one use-case example).

The vehicle 100 further includes a control system 192 with a controller 193 as shown in FIG. 1. The controller 193 may include a microcomputer with components such as a processor 194 (e.g., a microprocessor unit), input/output ports, an electronic storage medium 195 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 193 may receive various signals from sensors 196 coupled to various regions of the vehicle 100 and specifically the transmission 104. For example, the sensors 196 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, etc. Motor speed may be ascertained from the amount of power sent from the inverter to the electric machine. An input device 197 (e.g., accelerator pedal, brake pedal, drive mode selector, PTO mode selector, two wheel and four-wheel drive selector, combinations thereof, and the like) may further provide input signals indicative of an operator's intent for vehicle control. For instance, buttons, switches, or a touch interface may be included in the vehicle to enable the operator to toggle between a two-wheel drive mode and a four-wheel drive mode and/or engage and disengage the PTO from the first electric machine. However, in other examples, automated control strategies may be used to connect and disconnect the PTO.

Upon receiving the signals from the various sensors 196 of FIG. 1, the controller 193 processes the received signals, and employs various actuators 198 of vehicle components to adjust the components based on the received signals and instructions stored on the memory of controller 193. For example, the controller 193 may receive an accelerator pedal signal indicative of an operator's request for increased vehicle acceleration. In response, the controller 193 may command operation of the inverters to adjust electric machine power output and increase the power delivered from the machines to the transmission 104. The controller 193 may, during certain operating conditions, be designed to send commands to the clutches 141, 135, 148, 162, and/or synchronizer 133 to engage and disengage the clutches or synchronizer. For instance, a control command may be sent to a clutch assembly and in response to receiving the command, an actuator in the clutch assembly may adjust the clutch based on the command for clutch engagement or disengagement. The other controllable components in the vehicle may function in a similar manner with regard to sensor signals, control commands, and actuator adjustment, for example.

The controller 193 may be designed to control the clutches 148, 162 to synchronously shift between two of the transmission's operating gears. Further, the controller 193 may be designed to operate the clutches 135, 141, and/or the synchronizer 133 to selectively connect the PTO 128 and/or the transmission 104 from the first electric machine 106.

An axis system 199 is provided in FIG. 1, as well as FIGS. 2A-2D, for reference. The z-axis may be a vertical axis (e.g., parallel to a gravitational axis), the x-axis may be a lateral axis (e.g., horizontal axis), and/or the y-axis may be a longitudinal axis. However, alternate orientations of the axes may be used, in other examples.

The transmission 104 has two clutches that enable it to function as a two-speed transmission. However, in other embodiments, additional clutches may be added to the transmission to enable it to be operated in a greater number of gears. As such, the transmission may have three or more speeds, in other embodiments.

FIGS. 2A-2D depict power paths through the transmission 104 in four different operating modes. In the operating modes, depicted in FIGS. 2A and 2B, power bypasses the PTO 128. However, in the operating modes, depicted in FIGS. 2C and 2D, power is provided to the PTO 128. The components in the electric drivelines system 102, the transmission 104, etc. shown in FIGS. 2A-2D and previously described with regard to FIG. 1 are similarly numbered and redundant description is omitted for brevity.

Figure 2A:
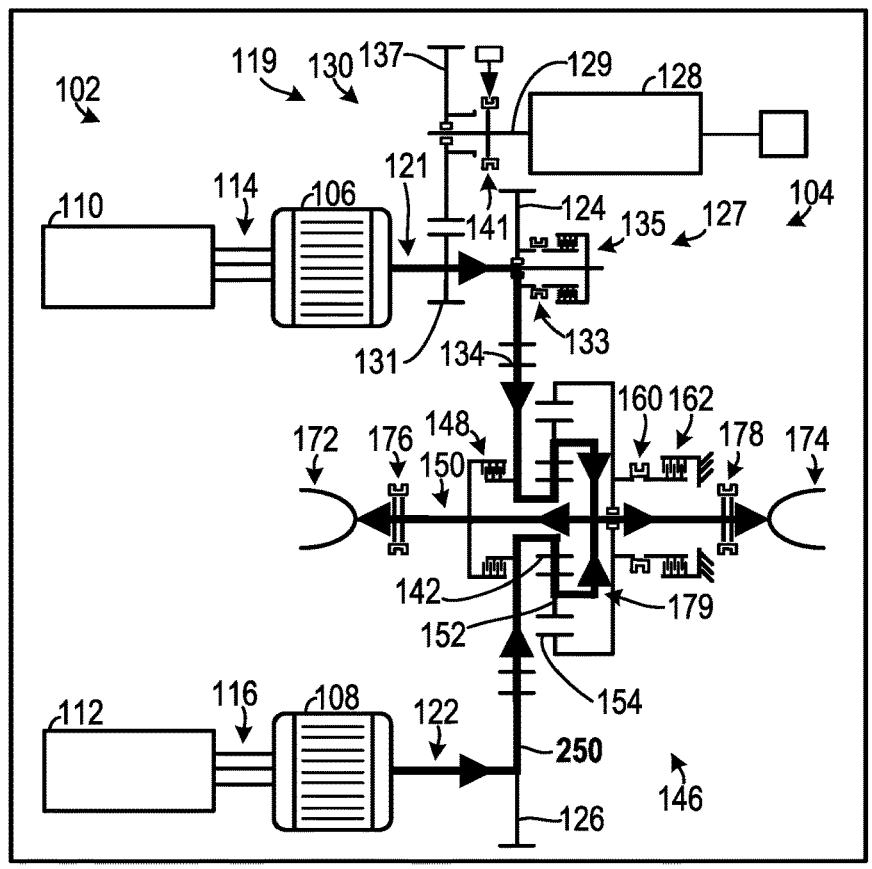
FIGS. 2A-2B show the power paths through the electric driveline system of FIG. 1 in a first and second gear configuration while a power take-off (PTO) is disconnected.
Figure 2B:
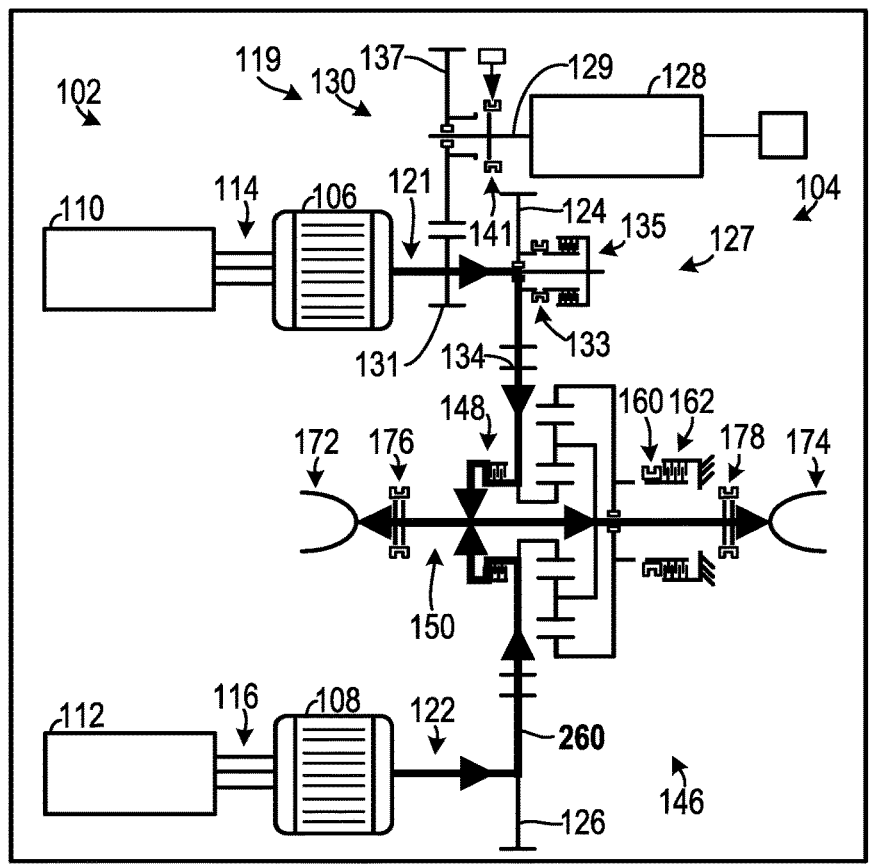

FIGS. 2A and 2B show the power paths through the transmission 104 in the electric driveline system 102 in a first gear mode and a second gear mode, respectively, where the PTO 128 is disconnected from the first electric machine 106. It will be understood that these power paths may correspond to both forward and reverse drive modes. Further, the electric machines may generate rotational output in opposite directions in the forward and reverse drive modes. In other words, in a forward drive mode, the first electric machine may rotate the output shaft 121 in a first direction and in a reverse drive mode, it may rotate the output shaft in the opposite direction. Thus, the power paths shown in FIGS. 2A and 2B generally correspond to drive mode operation.

The transmission's gear ratio in the first gear mode is higher than the gear ratio in the second gear mode. Thus, the first gear may be used during launch and subsequent acceleration while the second gear may be used for cruising operation, for instance. Further, as shown in FIGS. 2A and 2B, the disconnect clutches 176, 178 are engaged and therefore permit power to be transferred from the output shaft 150 both output interfaces 172, 174 and drive axles, correspondingly. However, one of disconnect clutches may be disengaged while the transmission is operating in the first gear and the second gear, when additional traction is not desired. For example, one of the disconnect clutches may be disengaged and vehicle correspondingly operates in a two-wheel drive mode when a vehicle operator requests said mode or when it is determined that the vehicle is not operating under low traction conditions.

Turning specifically to FIG. 2A, while the transmission 104 is operating in the first gear mode, the ring gear 154 is held stationary by the friction clutch 162 and the clutch 148 is disengaged. Further, the clutch 141 is disengaged so that the PTO gearset 130 is disconnected from the electric machine 106, and the clutch assembly 127 that includes the friction clutch 135 and the synchronizer 133 is engaged to couple the gear 124 for rotation with the output shaft 121 of the electric machine 106. The mechanical power path in the first gear mode (denoted via arrows 250) unfolds as follows: mechanical power moves from the first and second electric machines 106, 108 to the gear 124, 126, respectively, from the gears 124, 126 to the gear 134, from the gear 134 to the sun gear 142, from the sun gear to the planet gears 152, from the planet gears to the carrier 179, and from the carrier to the output shaft 150.

While the transmission 104 is operating in the second gear mode, as shown in FIG. 2B, the clutch 148 is engaged to permit mechanical power transfer between the gear 134 and the output shaft 150 and the clutch 162 is disengaged. Again, the clutch 141 is disengaged so that the PTO gearset 130 is disconnected from the electric machine 106, and the clutch assembly 127 is engaged to couple the gear 124 for rotation with the output shaft 121 of the electric machine 106. In the second gear mode, the mechanical power path (denoted via arrows 260) unfolds as follows: mechanical power moves from the first and second electric machines 106, 108 to the gears 124, 126, respectively, from the gears 124, 126 to the gear 134, from the gear 134 to the clutch 148, and from the clutch 148 to the output shaft 150.

Figure 2C:
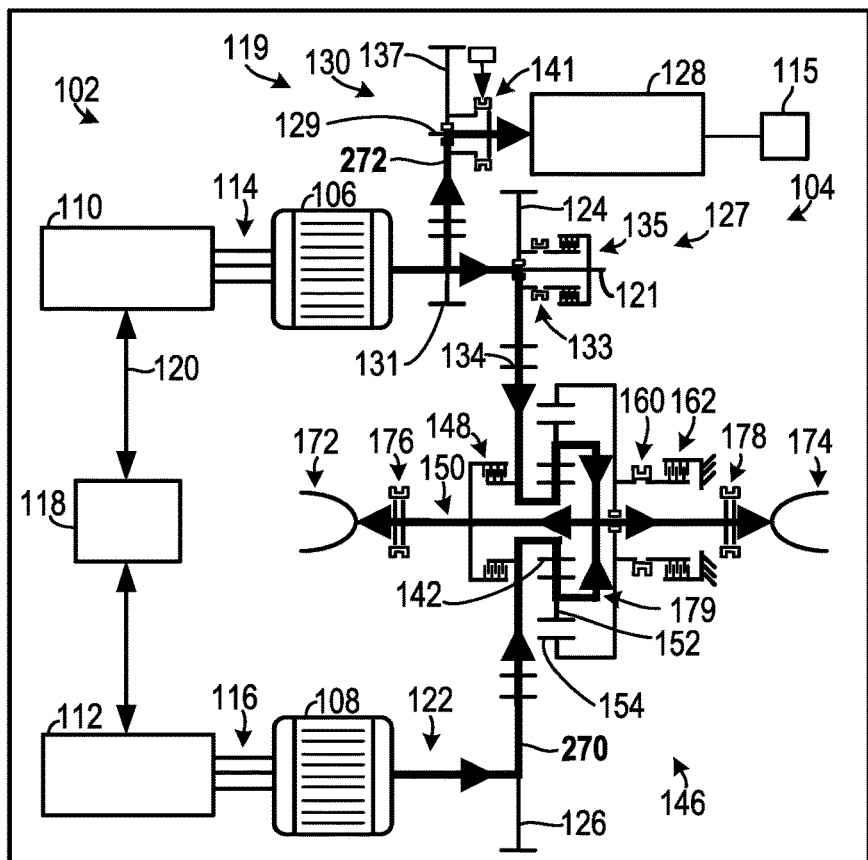
FIGS. 2C-2D illustrate exemplary power paths which provide power to the PTO of the electric driveline system, depicted in FIG. 1.

FIG. 2C shows the transmission 104 operating in a first gear mode in which the first electric machine 106 transfers power to both the transmission 104 and the PTO 128. Thus, in the first gear mode illustrated in FIG. 2C, the ring gear 154 is held stationary by the friction clutch 162 and the clutch 148 is disengaged. Further, the clutch assembly 127 is engaged (e.g., the clutch 135 and the synchronizer 133 are engaged) to enable mechanical power to be transferred from the output shaft 121 to the gear 124, and the clutch 141 is engaged enable power to be transferred from the gear 137 of the PTO gearset to the PTO input shaft 129. In this way, the first electric machine 106 is able to provide power to both the transmission 104 and the PTO 128.

In FIG. 2C the mechanical power path (denoted via arrows 270 and 272) unfolds as follows: mechanical power moves from the first and second electric machines 106, 108 to the gear 124, 126, respectively, from the gears 124, 126 to the gear 134, from the gear 134 to the sun gear 142, from the sun gear to the planet gears 152, from the planet gears to the carrier 179, and from the carrier to the output shaft 150. Additionally, a branch of the mechanical power path (denoted by arrows 272) flows from the electric machine 106 to the gear 131, from the gear 131 to the gear 137 of the PTO gearset 130, and from the gear 137 through the PTO input shaft 129 to the PTO 128. From the PTO 128 mechanical power may flow to the auxiliary device(s) 115. Thus, the operating mode, depicted in FIG. 2C, may be implemented to jointly power the PTO while executing forward drive operation. However, it will be understood that the first electric machine 106 is capable of transferring mechanical power to the PTO 128 across a wide speed range (e.g., the entire speed range) of the electric machine, as a result of the to the configuration of the clutch 141 and the clutch assembly 127 with the PTO gearset 130.

Figure 2D:
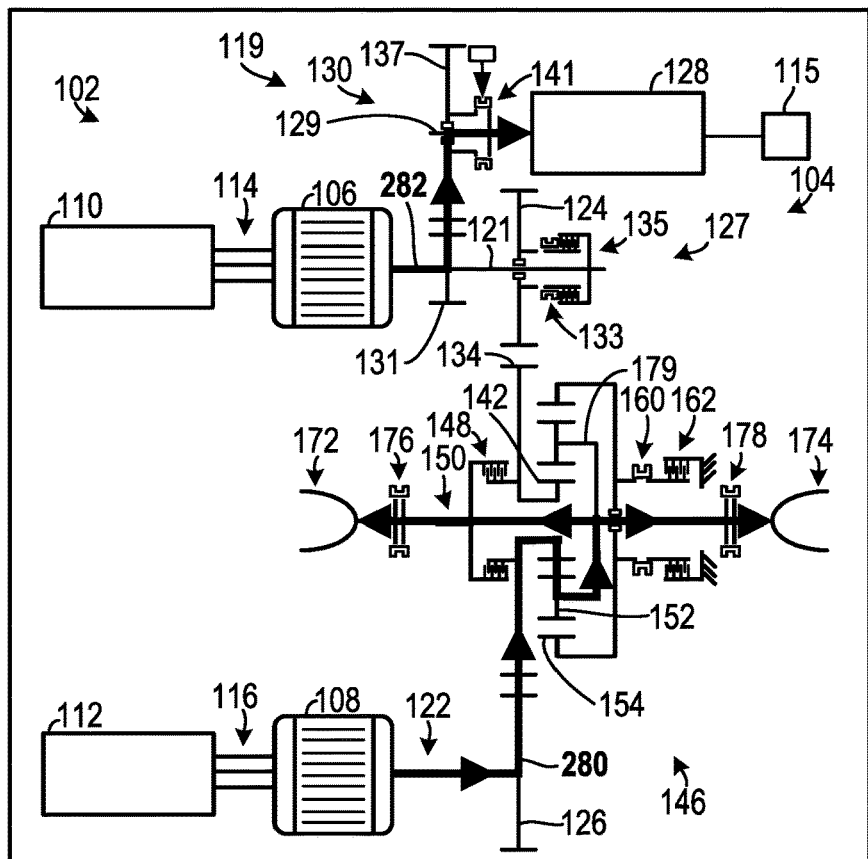

While the transmission 104 is operating in the mode illustrated FIG. 2D, the transmission 104 is again in the first gear ratio and operated to provide power to the PTO. However, unlike in the mode depicted in FIG. 2C, the first electric machine 106 is disconnected from the transmission in the mode depicted in FIG. 2D and the second electric machine 108 may be spun in a reverse such that the transmission 104 propels the vehicle backwards. Thus, in this mode, the clutch assembly 127 is disengaged, and the clutch 141 is engaged. Further, the ring gear 154 is held stationary by the friction clutch 162 and the clutch 148 is disengaged. The mechanical power path in the operating mode of FIG. 2D includes two power paths: a traction power path (denoted by arrows 280) and a PTO power path (denoted by arrows 282). The traction power path 280 unfolds as follows: mechanical power (e.g., produced via torque from the second electric machine 108 that has a reverse rotational direction) moves from the second electric machine 108 to the gear 126, from the gear 126 to the gear 134, from the gear 134 to the sun gear 142, from the sun gear to the planet gears 152, from the planet gears to the carrier 179, and from the carrier to the output shaft 150. The PTO power path 282 unfolds as follows: mechanical power moves from the electric machine 106 through the output shaft 121 to the gear 131, from the gear 131 to the gear 137, from the gear 137 through the PTO input shaft 129 to the PTO 128. From the PTO 128 mechanical power may flow to the auxiliary device(s) 115. In this way, the second electric machine 108 may be operated to provide reverse drive traction while the first electric machine 106 provides power to the PTO 128, in some examples, or while the vehicle is at a standstill (e.g., when electric machine 108 is not providing power to the transmission), in other examples.

FIG. 2E shows a chart 290 that correlates the configurations of the friction clutches 135, 148, 162 and the synchronizers 133, 141, 160 to the first and second gears while the system is operated in a forward drive mode with the PTO disconnected. In FIG. 2E as well as FIGS. 2F and 2G, an "X" denotes clutch engagement and a blank field conversely denotes clutch disengagement. Specifically, in the first gear mode, the friction clutch 148 is disengaged and the friction clutch 162 as well as the synchronizer 160 are engaged. Conversely, in the second gear mode, the friction clutch 148 is engaged and the friction clutch 162 as well as the synchronizer 160 are disengaged. In both the first and second gear modes, the synchronizer 141 is disengaged and the clutch 135 and synchronizer 133 are engaged, thereby disconnecting the first electric machine from the PTO and connecting the first electric machine and the transmission. To powershift between the first gear and the second gear, the clutch 148 may be engaged while the clutch 162 is disengaged. Subsequently to disengagement of the clutch 162, the synchronizer 160 may be disengaged. Conversely, to shift from the second gear back to the first gear, the synchronizer 160 may first be engaged and subsequently the clutch 162 may be engaged while the clutch 148 is disengaged. It will be understood that the synchronizer may be omitted from the system, in some examples. When powershifting is implemented in the transmission, power interruptions during shifting may be substantially avoided, thereby enhancing shifting performance.

FIG. 2F shows a chart 292 that correlates the configurations of the friction clutches 135, 148, 162 and the synchronizers 133, 141, 160 to the first and second gears while the system is operated in a forward drive mode with the PTO connected to the first electric machine. The configuration of the clutches 148, 162 and synchronizer 160 are identical to FIG. 2E and repeated description is therefore omitted for brevity. However, each of the synchronizers 133, 141 and the clutch 135 are engaged such that power is transferred from the first electric machine to both the transmission and the PTO in both the first and second gears. In this way, power may be transferred to the PTO across a wide vehicle speed range. As a result, the vehicle PTO capabilities are expanded, thereby increasing customer appeal.

FIG. 2G shows a chart 294 that correlates the configurations of the friction clutches 135, 148, 162 and the synchronizers 133, 141, 160 to the first and second gears while the system is operated in a reverse drive mode with the PTO connected to the first electric machine. It will be appreciated, that in the reverse drive mode the second electric machine is spun in a reverse rotational direction to propel the vehicle in reverse. The configuration of the clutches 148, 162 and synchronizer 160 are identical to FIG. 2F and repeated description is therefore omitted for concision. However, the synchronizer 141 is engaged and the synchronizer 133 and the clutch 135 are disengaged such that power is transferred from the first electric machine to the PTO in both the first and second gears while power transfer from the first electric machine to the transmission is inhibited. In this way, the second electric machine is able to provide reverse drive rotational input to the transmission without interfering with PTO operation. Consequently, the system's PTO capabilities are even further expanded.

Figure 3A:
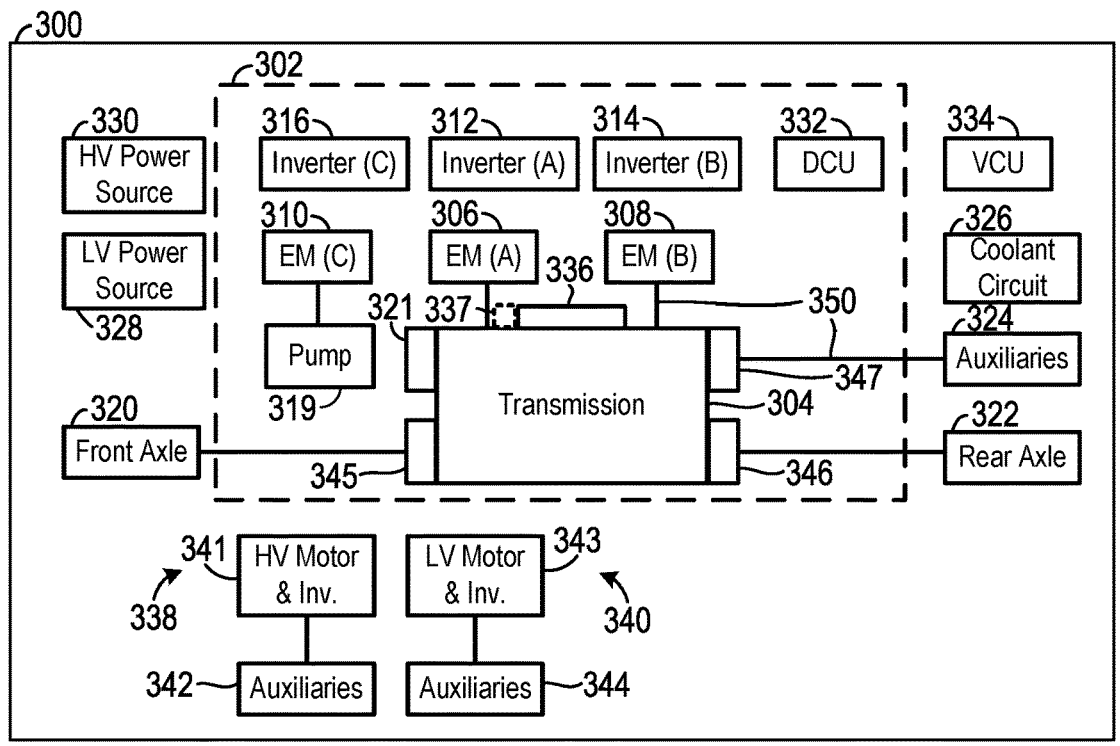
FIG. 3A-3C show mechanical, hydraulic, and electrical connections, respectively, in an electric driveline system of a vehicle.
Figure 3B:
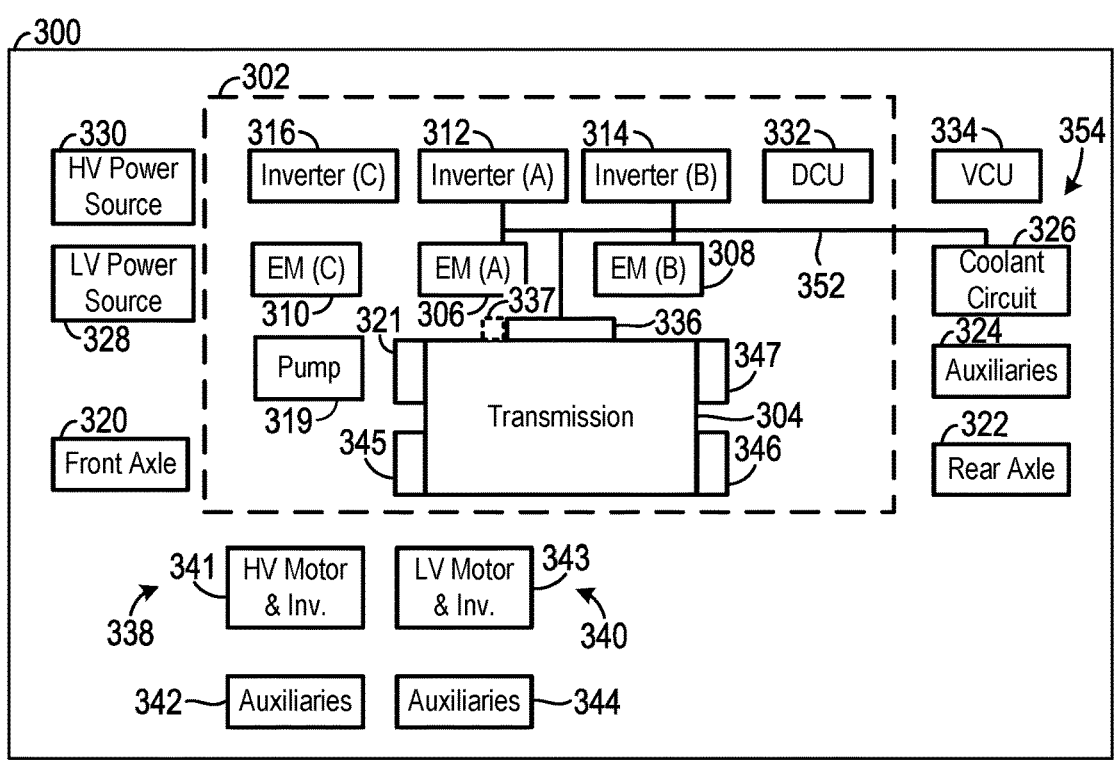
Figure 3C:
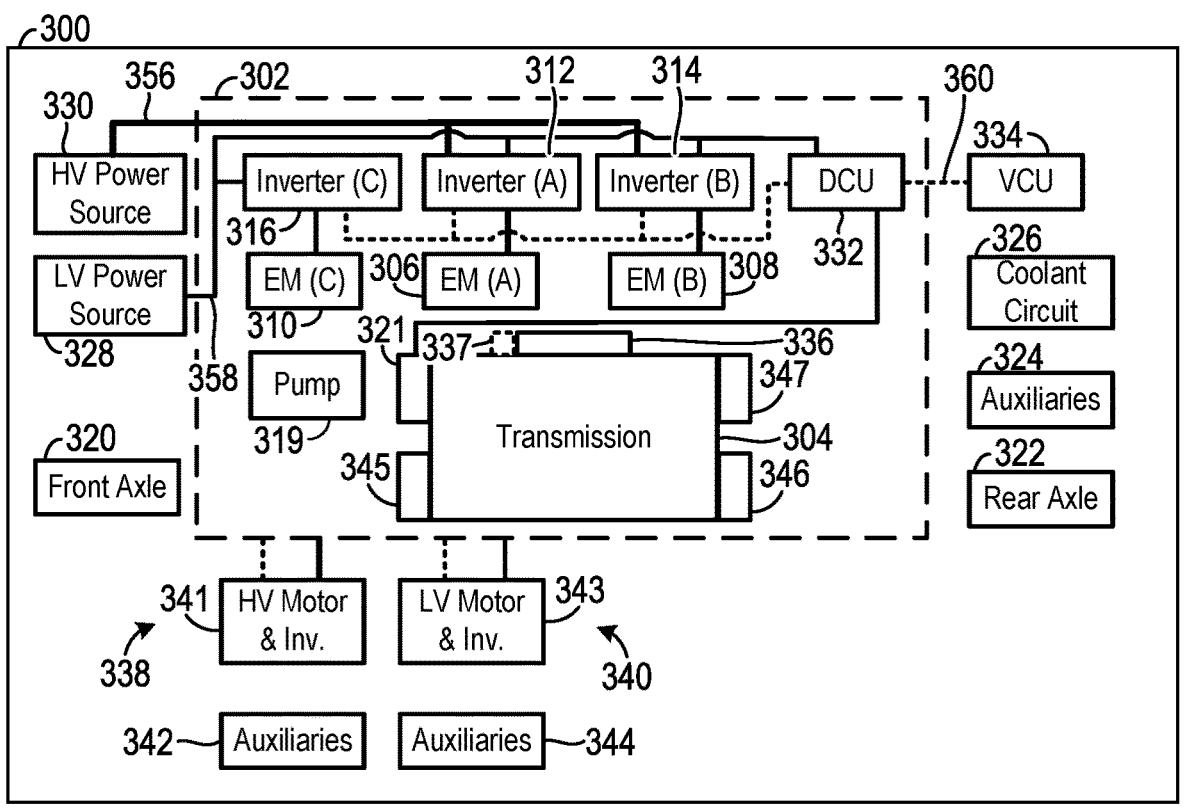

FIG. 3A-3C show another example of a vehicle 300 with an electric driveline system. The boundary of the electric driveline system is denoted via dashed lines 302. However, it will be appreciated that the system may include a different grouping of components, in other examples. The electric driveline system 302 includes a transmission 304. The electric driveline system 302 with the transmission 304 shown in FIGS. 3A-3C may share common features with the electric driveline system 102 and the transmission 104 shown in FIGS. 1-2D. Redundant description is therefore omitted. FIGS. 3A-3C specifically illustrate the mechanical, coolant, and electrical connections, respectively, between components in the electric driveline system 302 as well as other vehicle components. Although the mechanical, coolant, and electrical connections are illustrated in separate figures for clarity, it will be understood that these connections may all be present in the electric driveline system.

The driveline system 302, shown in FIGS. 3A-3C, include a first electric machine 306, a second electric machine 308, and a third electric machine 310. The electric driveline system 302 further includes a first inverter 312, a second inverter 314, and a third inverter 316 that are associated with the first electric machine 306, the second electric machine 308, and the third electric machine 310, respectively. The vehicle 300 further includes a pump 319 that is designed to circulate lubricant (e.g., oil) in the transmission 304. A valve 321 coupled to the transmission 304 may be used to regulate lubricant flow from the pump 319 to the transmission.

The vehicle 300 further includes a first axle 320 (e.g., a front axle) and a second axle 322 (e.g., rear axle). The vehicle 300 may further include auxiliary devices 324, such as a steering pump, an air conditioning pump, a hydraulic pump for working functions, and the like. Still further, the vehicle may include a coolant circuit 326, a lower voltage power source 328 (e.g., a battery, a capacitor, combinations thereof, and the like), and a higher voltage power source 330 (e.g., a battery, a capacitor, combinations thereof, and the like). The driveline system 302 may include a DCU 332 and the vehicle 300 may include a VCU 334. However, other control unit arrangements have been contemplated, such as a common control unit which is used to adjust operation of both the driveline system 302 and components in the vehicle 300. Each of the control units may include any know data storage mediums (e.g., random access memory (RAM), read only memory (ROM), keep alive memory, combinations thereof, and the like) and a processor (e.g., micro-processor unit) designed to execute instructions stored in the data storage mediums. As such, the DCU 332 and/or the VCU 334 may perform the control methods, techniques, schemes, etc. described herein such as the method shown in FIG. 4. Further the DCU may be designed to coordinate operation of the inverters 312, 314, and 316 to increase the system's efficiency. For instance, the DCU may be operated to balance power between the inverter 312 and 314 to increase the driveline system's efficiency. Specifically, in one example, the DCU may operate the inverter 312 and 314 to reduce torque generated by one of the electric machines and increase torque generated by the other electric machine such that they operate in a target efficiency point or range. Additionally, the DCU may be operated to control the inverter 316 to enable a desired lubricant flow to be achieved. The DCU may further be designed to implement fault reactions and diagnostics. For example, the DCU may implement a limp home mode when minor component degradation is detected, such as a degradation of a speed sensor. Further, the DCU may shutdown if the controller area network (CAN) is degraded, in some scenarios.

A heat exchanger 336 may further be coupled to (e.g., directly coupled to or incorporated into) the transmission 304. In other examples, the heat exchanger 336 may be coupled to a vehicle frame 337. The heat exchanger 336 may include components for transferring thermal energy between a coolant circuit and an oil circuit, such as adjacent coolant and oil passages, a housing, and the like. In this way, heat may be efficiently removed from the transmission's lubrication circuit. In one example, the heat exchanger 336, such as a liquid-liquid cooler, may be bolted or otherwise mechanically attached to the transmission housing. In another example, the heat exchanger 336 may be formed by integrating coolant passages into the sump housing.

Electric PTOs 338, 340 may further be included in the vehicle 300. The electric PTO 338 may include a higher voltage motor and an inverter 341 coupled to auxiliary devices 342 (e.g., a steering pump, a pump for working hydraulic devices, an air conditioning pump, and the like). The electric PTO 340 may include a lower voltage motor and an inverter 343 coupled to auxiliary devices 344. Providing electric PTOs in the vehicle expands the vehicle's capabilities and adaptability. Consequently, the driveline system may be used in a wider variety of vehicle platforms. Furthermore, by using electric PTOs that operate with different voltages, the motors in the PTOs may be granularly tuned to meet the demands of the specific auxiliary devices to which they are attached, if wanted. However, in other examples, the electric PTO may be operated using a similar voltage.

The driveline system 302 may further include a first axle disconnect clutch 345 and a second axle disconnect clutch 346. Each of the disconnect clutches may be friction clutches, dog clutches, or other suitable clutches that are designed to rotationally couple and decouple the transmission output interfaces from the corresponding axle. A PTO 347 may further be coupled to the transmission 304 and the auxiliary devices 324.

FIG. 3A maps the mechanical connections between the components in the driveline system 302 as well as the vehicle 300. These mechanical connections are denoted via lines 350. The mechanical connections may be formed via shafts, joints, belts, chains, combinations thereof, and the like. As shown, the first electric machine 306 and the second electric machine 308 are rotationally coupled to the transmission 304. Providing two electric machines mechanically coupled to the transmission may permit driveline efficiency to be increased. Further, the likelihood of the driveline system becoming inoperable due to motor degradation is reduced when there is electric machine redundancy in the driveline system.

The transmission 304 is also rotationally coupled to the first axle 320 and the second axle 322, and the disconnect clutches 345, 346 may permit the axles to be connected and disconnected from the transmission 304 according to operator input and/or vehicle operating conditions, for instance.

The third electric machine 310 may be rotationally coupled to the pump 319 and the pump may be in fluidic communication with the transmission 304 via the valve 321. The third electric machine 310 may be operated independently from the first and second electric machines 306, 308. To elaborate, the third electric machine 310 may be adjusted to more aptly track with the lubricant demands of the transmission. In this way, the system's efficiency can be increased without impacting transmission lubrication operation, if wanted.

The PTO 347 is mechanically coupled to the auxiliary devices 324. Further, the electric PTOs 338, 340 are mechanically coupled to the auxiliary devices 342, 344, respectively. In this way, the system's PTO capabilities may be expanded to meet a variety of auxiliary device demands across a wide breadth of vehicle platforms. The system's customer appeal is consequently increased.

FIG. 3B shows the coolant connections, denoted via lines 352, in a cooling assembly 354 of the electric driveline system 302. The coolant connections may be established via conduits, ducts, and the like which are routed (e.g., internally and/or externally routed) through various system components. The coolant may include water and/or glycol. The cooling assembly 354 may include the coolant circuit 326 which may have a coolant pump and a heat exchanger. As shown, coolant may be routed to the heat exchanger 336, the first electric machine 306, the second electric machine 308, the first inverter 312, and the second electric machine 308 in parallel. Additionally or alternatively, the coolant may be routed to one or more of the following components in series: the heat exchanger 336, the first electric machine 306, the second electric machine 308, the first inverter 312, and the second electric machine 308. In this way, the electric machines, inverters, and transmission lubricant may be efficiently cooled. The heat exchanger 336 is designed to transfer heat from lubricant (e.g., oil) routed through the transmission to coolant in the cooling assembly 354. Providing the heat exchanger with an oil to coolant heat transfer functionality permits a liquid to air heat exchanger, such as a radiator, to be omitted from the system, if wanted. The system's size, complexity, and/or manufacturing costs may be reduced, as a result.

Alternatively, the first and/or second electric machines 306, 308 as well as the first and/or second inverters 312, 314 may be oil cooled. In such an example, the heat exchanger 336 may be omitted from the system.

FIG. 3C shows electrical and data connections in the vehicle 300 and the electric driveline system 302. The electrical connections are specifically divided into higher voltage connections (denoted by thicker lines 356) and lower voltage connections (denoted by thinner lines 358). Data connections are denoted via dashed lines 360. The higher voltage connections emanate from the higher voltage power source 330 and the lower voltage connections emanate from the lower voltage power source 328. In one use-case example, the lower voltage may in the range between 12V and 144V and the higher voltage may be in the range between 350V and 800V.

The higher voltage power source 330 may be electrically coupled to the first inverter 312 and the second inverter 314. Likewise, higher voltage electrical connections may be established between the first and second electric machines 306, 308 and the first and second inverters 312, 314. A higher voltage connection may additionally be established between the electric PTO 338 and the driveline system 302.

The lower voltage power source 328 may be electrically coupled to the first inverter 312, the second inverter 314, the third inverter 316, and/or the DCU 332. A lower voltage connection may additionally be established between the third inverter 316 and the third electric machine 310 as well as the electric PTO 340 and the driveline system 302. Further, a lower voltage connection may be established between the DCU 332 and the valve 321.

Data connections may be established between the VCU 334 and the DCU 332. For instance, operating condition data such as vehicle speed, pedal position (e.g., brake pedal position and/or accelerator pedal position), drive mode selector positon, and the like may be transferred from the VCU to the DCU. Conversely, operating condition data such as electric machine speed, electric machine temperature, power source SOC, clutch position, transmission temperature, and the like may be transferred from the DCU to the VCU. In this way, data may be shared between the DCU and the VCU to enhance control routines at each control unit. A data connection may also be established between the DCU 332 and the first inverter 312, the second inverter 314, and/or the third inverter 316. Further, data may be transferred from the electric PTOs 338 and 340 to the driveline system 302.

Figure 4:
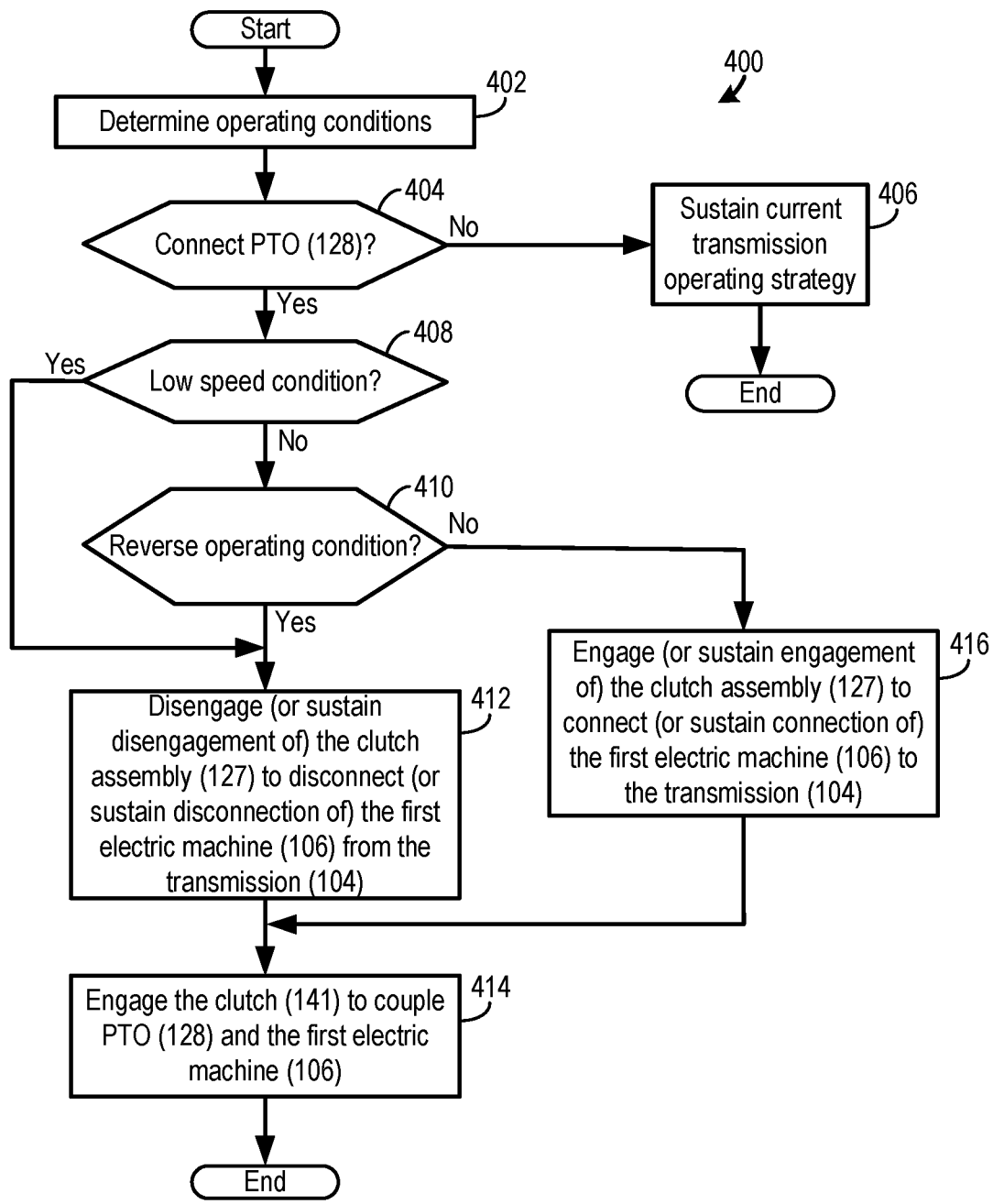
FIG. 4 shows a method for operation of an electric driveline system.

FIG. 4 shows a method 400 for operation of an electric driveline system. The method 400 may be carried out via the electric driveline systems 102 and/or 302, discussed above with regard to FIGS. 1-3C, in one example. However, in other examples, the method 400 may be implemented by other suitable electric driveline systems. Instructions for carrying out method 400 may be executed by a controller, such as the controller 193 in FIG. 1 or the DCU 332 and/or the VCU 334 in FIGS. 3A-3C, by executing instructions stored in a memory of the controller and in conjunction with signals received from sensors at the controller. The controller may employ actuators in different system components to implement the method steps described below.

At 402, the method includes determining operating conditions. The operating conditions may include speeds of the electric machines, transmission output shaft speed, vehicle speed, clutch positon, pedal position, transmission load, current PTO power demand, and the like. These conditions may be determined using sensors and/or modeling algorithms.

At 404, the method judges if the PTO (e.g., PTO 128, shown in FIG. 1) should be connected to the transmission to receive power therefrom. The PTO connection judgment may be carried out based on an operator demand, and may in some cases involve determining the amount of torque demanded at the PTO. For instance, if an auxiliary device has been connected to the PTO and/or the operator requests PTO connection, it may be judged that a PTO connection is desired. However, additional or alternative factors may be taken into account when judging whether or not to connect the PTO to the transmission.

If it is judged that the PTO should not be connected to the transmission (NO at 404), such as when there is no power request for the PTO, the method moves to 406. At 406, the method includes sustaining the current transmission operating strategy. For instance, the transmission may be held in its current operating gear by sustaining engagement of one of the friction clutches and disengagement of the other friction clutch. Further, one of the clutches in the PTO assembly (e.g., the synchronizer 141 shown in FIG. 1) may be sustained in a disengaged configuration.

Conversely, if it is judged that the PTO should be connected to receive power from the transmission (YES at 404), the method moves to 408. At 408, the method includes determining if the transmission is operating under a low speed condition or if the transmission output speed is substantially zero. This low speed condition may be a condition where the operating speed of the electric machines precludes the PTO from being driven to achieve current PTO power demands.

If it is determined that the transmission is not operating under a low speed condition (NO at 408) the method moves to 410. At 410, the method judges if the transmission is operating under a reverse operating condition. The reverse condition may be ascertained using the rotational direction of one or more of the electric machines. For instance, as previously described, the electric machines have a reverse drive rotational direction and an opposite forward drive rotational direction. When the gears 124, 126 on the electric machine output shafts directly mesh with the gear 134, shown in FIG. 1, the rotational direction of each machine in both the forward and reverse drive modes may be opposite one another. For instance, in the forward drive mode, the first electric machine may rotate clockwise and the second electric machine may rotate counter-clockwise or vice versa. However, in other transmission configurations, the electric machines may each rotate in the same direction in the forward drive mode and may each rotate in the opposite direction in the reverse drive mode.

If it is determined that the transmission is operating under a low speed condition (YES at 408) or if it is determined that the transmission is operating in reverse (YES at 410), the method moves to 412. At 412, the method includes disengaging (or sustaining disengagement of) the clutch assembly (e.g., the clutch assembly 127, shown in FIG. 1) to disconnect (or sustain disconnection of) the first electric machine (e.g., the first electric machine 106, shown in FIG. 1) from the transmission (e.g., the transmission 104, shown in FIG. 1). In this way, one of the electric machines may be decoupled from the transmission while the other machine drives the transmission in reverse.

Next at 414, the method includes engaging the clutch (e.g., the clutch 141, shown in FIG. 1) to couple the PTO (e.g., the PTO 128, shown in FIG. 1) and the first electric machine (e.g., the first electric machine 106, shown in FIG. 1). In this way, the first electric machine is used to drive the PTO while the second electric machine and transmission are operated in the reverse drive mode or while the transmission is operated at low speeds or at standstill. Consequently, the range of operating conditions over which the PTO may be used is expanded.

If it is determined that the transmission is not operating in reverse (NO at 410) the method moves to 416. At 416, the method includes engaging (or sustain engagement of) the clutch assembly (e.g., the clutch assembly 127 shown in FIG. 1) to connect (or sustain connection of) the first electric machine (e.g., the first electric machine 106, shown in FIG. 1) to the transmission (e.g., the transmission 104, shown in FIG. 1). In this way, both the first and second electric machines may be used to drive the transmission when it is not operating under a low speed condition or in reverse. After 416 the method moves to 414. Method 400 enables the PTO to be operated across an expansive range of operating conditions and permits the system's capabilities with regard to powering auxiliary devices using the PTO to be significantly expanded.

The technical effect of the electric driveline system operating method described herein is to expand the drive system's PTO capabilities and specifically allow joint PTO operation and reverse drive operation, without constraining the capabilities of the transmission or PTO, if wanted.

FIGS. 1-2D and 3A-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, an electric driveline system is provided that comprises a first electric machine and a second electric machine mechanically coupled to a transmission; and a power take-off (PTO) assembly coupled to the first electric machine and comprising a first clutch coupled to a PTO gearset and designed to selectively disconnect a PTO from the first electric machine, wherein the PTO gearset is mechanically coupled to the first electric machine.

In another aspect, a method for operation of an electric driveline system is provided that comprises selectively mechanically coupling a power take-off (PTO) to a first electric machine while a second electric machine transfers mechanical power to a transmission through operation of a first clutch; wherein the second electric machine is mechanically coupled to a gear in a transmission gearset; and wherein the first electric machine is selectively mechanically coupled to the gear in the gear in the transmission gearset. The method may further comprise, in one example, disconnecting the first electric machine and the PTO from the transmission, while the PTO is connected to the first electric machine, through operation of a second clutch and a third clutch that are coupled to a gear on an output shaft of the first electric machine. In another example, the method may further comprise, while the first electric machine and the PTO are disconnected from the transmission, shifting the transmission between two discrete gear ratios through operation of two wet clutches in the transmission. In yet another example, the second electric machine may transfer mechanical power to the transmission to rotate the transmission in a reverse direction. Further, in another example, the first clutch may be a synchronizer or a friction clutch.

In yet another aspect, an electric driveline system is provided that comprises a first electric machine and a second electric machine mechanically coupled to a transmission; and a power take-off (PTO) assembly coupled to the first electric machine and comprising a first clutch designed to selectively couple an input shaft of a PTO to a PTO gearset, and a second clutch designed to selectively disconnect the first electric machine from the transmission.

In any of the aspects of combinations of the aspects, the electric driveline system may further comprise a second clutch designed to selectively disconnect the first electric machine from the transmission.

In any of the aspects of combinations of the aspects, the electric driveline system may further comprise a controller including instructions that when executed, while the second electric machine is transferring mechanical power to the transmission, cause the controller to operate the second clutch to disconnect the transmission from the first electric machine.

In any of the aspects of combinations of the aspects, the PTO may be disconnected when the second electric machine is operated to rotate the transmission in a reverse drive direction.

In any of the aspects of combinations of the aspects, the electric driveline system may further comprise a controller including instructions that when executed, while the electric driveline system is operated across its speed range, cause the controller to operate the first clutch to transfer mechanical power from the first electric machine to the PTO.

In any of the aspects of combinations of the aspects, the second clutch may be a friction clutch.

In any of the aspects of combinations of the aspects, the electric driveline system may further comprise a synchronizer arranged coaxial with the friction clutch and an output shaft of the first electric machine.

In any of the aspects of combinations of the aspects, the first clutch may be designed to selectively couple to a gear to an output shaft of the first electric machine; and the gear may mesh with a transmission gear.

In any of the aspects of combinations of the aspects, the first clutch may be a synchronizer.

In any of the aspects of combinations of the aspects, the first clutch may be a wet friction clutch.

In any of the aspects of combinations of the aspects, the transmission may be a multi-speed transmission that includes a planetary gearset and two friction clutches.

In any of the aspects of combinations of the aspects, the transmission may include two outputs coupled to two drive axles.

In any of the aspects of combinations of the aspects, the electric driveline system may further comprise a controller including instructions that when executed, while the second electric machine is transferring mechanical power to the transmission, cause the controller to: operate the second clutch to disconnect the transmission from the first electric machine; and operate the first clutch to transfer mechanical power from the first electric machine to the PTO.

In any of the aspects or combinations of the aspects, the second electric machine may transfer mechanical power to the transmission to rotate the transmission in a reverse direction.

In another representation, a method for operating an electric drive unit is provided that includes selectively engaging a first clutch to transfer power to a power take-off (PTO) from a first electric motor and selectively disengaging a second clutch to inhibit power transfer from the first electric motor to a transmission while a second electric motor is providing power to the transmission.

In another representation, an electric drive unit is provided that includes a first electric machine and a PTO system designed to connect and disconnect a PTO from the first electric machine based on one or more operating conditions and a second electric machine designed to transfer mechanical power to a transmission while the first electric machine is connected and disconnected from the PTO.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric driveline system, comprising:
a first electric machine and a second electric machine mechanically coupled to a transmission; and
a power take-off (PTO) assembly coupled to the first electric machine and comprising:
a first clutch coupled to a PTO gearset and designed to selectively disconnect a PTO from the first electric machine;
a second clutch designed to selectively disconnect the first electric machine from the transmission, wherein the second clutch is a friction clutch; and
a synchronizer arranged coaxial with the second clutch, wherein the PTO gearset is mechanically coupled to the first electric machine; and
wherein the second electric machine includes an output shaft, the output shaft only directly coupled to the second electric machine and a first gear, the first gear configured to be in meshing engagement with a transmission gear of the transmission to provide the mechanical coupling between the second electric machine and the transmission.

2. The electric driveline system of claim 1, further comprising:
a controller including instructions that when executed, while the second electric machine is transferring mechanical power to the transmission, cause the controller to:
operate the second clutch to disconnect the transmission from the first electric machine.

3. The electric driveline system of claim 2, wherein the PTO is disconnected from the transmission and connected to the first electric machine when the second electric machine is operated to rotate the transmission in a reverse drive direction.

4. The electric driveline system of claim 1, further comprising:
a controller including instructions that when executed, while the electric driveline system is operated across its speed range, cause the controller to:
operate the first clutch to transfer mechanical power from the first electric machine to the PTO.

5. The electric driveline system of claim 1, wherein the synchronizer is arranged coaxial with an output shaft of the first electric machine.

6. The electric driveline system of claim 1, wherein:
the second clutch is designed to selectively couple a second gear to an output shaft of the first electric machine; and
the second gear meshes with the transmission gear.

7. The electric driveline system of claim 1, wherein the first clutch is a synchronizer.

8. The electric driveline system of claim 1, wherein the first clutch is a wet friction clutch.

9. The electric driveline system of claim 1, wherein the transmission is a multi-speed transmission that includes a planetary gearset and two friction clutches, the planetary gearset including the transmission gear.

10. The electric driveline system of claim 1, wherein the transmission includes two outputs coupled to two drive axles.

11. The electric driveline system of claim 10, wherein the transmission further includes a transmission output shaft connected to the two outputs and two friction clutches, and wherein the two friction clutches and the transmission output shaft are coaxially arranged.

12. An electric driveline system, comprising:
a first electric machine and a second electric machine mechanically coupled to a transmission;
a power take-off (PTO) assembly coupled to the first electric machine and comprising a first clutch coupled to a PTO gearset and designed to selectively disconnect a PTO from the first electric machine;

a second clutch designed to selectively disconnect the first electric machine from the transmission, wherein the second clutch is a friction clutch; and a synchronizer arranged coaxial with the friction clutch and an output shaft of the first electric machine;

wherein the PTO gearset is mechanically coupled to the first electric machine.

13. An electric driveline system, comprising:

a first electric machine and a second electric machine mechanically coupled to a transmission; and a power take-off (PTO) assembly coupled to the first electric machine and comprising:

a first clutch designed to selectively couple an input shaft of a PTO to a PTO gearset;

a second clutch designed to selectively disconnect the first electric machine from the transmission, wherein the second clutch is a friction clutch; and a synchronizer arranged coaxial with the second clutch, wherein the second electric machine includes an output shaft, the output shaft only directly coupled to the second electric machine and a first gear, the first gear configured to be in meshing engagement with a transmission gear of the transmission to provide the mechanical coupling between the second electric machine and the transmission.

14. The electric driveline system of claim 13, further comprising:

a controller including instructions that when executed, while the second electric machine is transferring mechanical power to the transmission, cause the controller to:

operate the second clutch to disconnect the transmission from the first electric machine; and operate the first clutch to transfer mechanical power from the first electric machine to the PTO.

15. The electric driveline system of claim 14, wherein the second electric machine transfers mechanical power to the transmission to rotate the transmission in a reverse drive direction while the first electric machine transfers mechanical power to the PTO.

* * * * *